United States Patent [19]

LaHaye et al.

[11] 4,380,429
[45] Apr. 19, 1983

[54] RECIRCULATING BURNER

[75] Inventors: Paul G. LaHaye; John W. Bjerklie, both of Cape Elizabeth, Me.

[73] Assignee: Hague International, Portland, Me.

[21] Appl. No.: 90,731

[22] Filed: Nov. 2, 1979

[51] Int. Cl.³ ............................................. F23L 7/00
[52] U.S. Cl. .................................................... 431/115
[58] Field of Search .......................... 431/9, 115, 116; 432/152

[56]  References Cited
U.S. PATENT DOCUMENTS

| | | | |
|---|---|---|---|
| 3,269,448 | 8/1966 | Martin | 431/116 |
| 3,741,166 | 6/1973 | Bailey | 431/116 |
| 4,060,379 | 11/1977 | LaHaye et al. | 431/9 |

Primary Examiner—Carroll B. Dority, Jr.
Attorney, Agent, or Firm—Wolf, Greenfield & Sacks

[57] ABSTRACT

An internally recirculating burner designed to operate at a low level of excess air without producing intolerable levels of particulate (smoke) and oxides of nitrogen using ambient or highly preheated atmospheric air as an oxidant. The burner operates with a flame front outside of the burner in the combustion chamber with recirculation of furnace gas being provided by the geometric configuration of the burner and the energy provided by the incoming combustion air. A nozzle means for controlling the combustion air flow is disclosed concentric with the burner center body. The nozzle is comprised of a fixed ceramic nozzle plate having annularly arranged distribution holes and a nozzle plus also preferably of ceramic supported to open and close the annular flow passage between the nozzle and the burner center body as well as the annular flow distribution holes. The air discharged through the nozzle flows along the surface of the center body creating a pressure depression at the point of discharge causing the furnace gas to flow from the furnace chamber to the passage formed by the burner barrel and the outside diameter of the recirculating sleeve. The recirculated gas joins the incoming combustion air and flows parallel to the combustion air through the annular passage formed by the inside diameter of the recirculating sleeve and the outside diameter of the center body. Some mixing of the combustion air and the recirculating gas occurs within the recirculating sleeve. A flame holder forming a portion of the center body central tube at the discharge end of the burner creates eddies and provides for a flame holding zone in which the fuel can be injected and the flame sustained. The flame thus formed extends into the combustion zone to the point at which the combustion reaction is completed.

19 Claims, 2 Drawing Figures

RECIRCULATING BURNER

BACKGROUND OF THE INVENTION

The present invention relates to a recirculating burner design preferably for use in an energy conserving process furnace of the type that may employ a recuperator for preheating the combustion air to a temperature of 600°–2,400° F. in a steel forging furnace.

In an energy conserving process furnace employing a recuperator, and a recirculating burner as shown in U.S. Pat. No. 4,060,379, issued Nov. 29, 1977, and assigned to the same assignee as the instant invention, there is described a recirculating burner which operates satisfactorily in the combination. However, there is described herein in accordance with this invention an improved form of a recirculating burner such as might be employed in the furnace system described in this patent. The improvements in the recirculating burner are exemplified by the following and other objects which will become more apparent upon a reading of the details thereof described hereinafter.

One object of the present invention is to provide a recirculating burner that is substantially reduced in size and that, in particular, has been shortened in length. This reduction in the size of the burner has been accomplished without any degradation in the operation or efficiency of the burner. The reduction in size now simplifies servicing of the burner and permits extracting of the burner from the furnace without requiring as substantial a clear space for purposes of burner removal as heretofore necessary.

Another object of the present invention is to provide an improved means for controlling combustion air metering into the burner. In this connection, there is described an improved nozzle arrangement preferably employing a plug valve which provides improved linear adjustment for air intake into the burner. The improvement provides for better distribution throughout the annular flows passage entering the burner and permits a more linear relationship between the physical position of the valve and the quantity of air passing the valve as well as a lower level of leakage when the valve is in the closed position. In this connection it is noted that the U.S. Pat. No. 4,060,379 provides a nozzle for directing combustion air but does not disclose a means for control associated with the nozzle.

A further object of the present invention is to provide a recirculating burner which is adapted to receive preheated combustion air and which preferably has a flame front maintained outside of the burner in the furnace cavity to increase recirculation of furnace gases and to maximize efficiency of the burner.

Still another object of the present invention is to provide an improved recirculating burner which lowers energy requirements necessary to maintain a desired temperature such as in the process furnace applications and other similar applications.

A still further purpose of the invention is to provide ample mixing within the furnace cavity to avoid isolated stratified pockets of gas which cause non-uniform heating of the thermal energy absorbing surfaces of the furnace.

Still a further object of the present invention is to provide a recirculating burner which is operable at a relatively high temperature of intake air to thus achieve considerable fuel savings and optimize the combustion process.

Another object of the present invention is to provide an improved internally recirculating burner design which operates with a low level of smoke and which is able to operate with either ambient or highly preheated air even at temperatures in the range of 600° F. to 2,400° F. or possibly higher. Although it is preferred that highly preheated air be used, it has been found that there is improved furnace efficiency even when combustion air at ambient temperature is employed.

A further object of this invention is to provide a burner capable of operating on or near the optimum fuel air ratio or stoichiometric ratio without generating excessive quantities of nitrogen oxide as well as particulate (smoke).

Still a further object of the present invention is to provide an internally recirculating burner which is capable of burning a wide variety of fuels such as natural gas and a mixture of coal and residual oil in 50%—50% portions.

Another object of the present invention is to provide an improved recirculating burner design that operates over a wide range of fuel and air flow independently while maintaining flame at a single geometric setting of the nozzle and other components, thus providing ample turndown of the energy released by the burner and ample variations in the ratio of fuel to air.

Still another object of the present invention is to provide an improved internally recirculating burner design in association with the furnace system and wherein the burner is easily interchangeable with other burner designs.

A still further object of the invention is to combust a variety of fossil fuels within the furnace cavity so completely as to eliminate the "gray haze" normally generated by contemporary burners which interfers with the transmission of energy from the flame to the heat absorbing surfaces of the furnace by radiation.

A further object of the invention is to provide a burner which approaches a "perfect mixer." In such a burner, stoichiometric quantities of fuel and air are reacted to form the products of complete combustion without producing unburned hydrocarbons and releasing surplus oxygen (excess air) to carry out and waste the energy released by the combustion process. The subject of this invention approach is the perfect mixer concept, and it affords an opportunity to effectively use sorbents to absorb the sulfur which may be present in the fuel. Sulfur removal by the use of additives which would react in the flame zone to absorb the sulfur in the fuel has long been a goal of researchers. Laboratory demonstrations have shown the feasibility of employing sorbents directly in the fuel; however, in practice, such methods yield absorption rates of 75% to 80%, which is not adequate. Further, large quantities of the sorbent material have been required to accomplish these results. In most instances, 3–5 times the stiochiometric quantity of sorbent is required to obtain a level of 80% sulfur absorption.

Demonstrations have been performed with the invention wherein sorbents were employed at concentrations of 1½ to 2 times the stoichiometric quantity. These demonstrations were performed with a 50%—50% mixture of coal and number 6 oil. The results of the test revealed that 96% of the sulfur in the fuel could be removed in the flame zone by the use of sorbents with the burner.

SUMMARY OF THE INVENTION

To accomplish the foregoing and other objects of this invention, there is provided an improved internally recirculating burner which is preferably used with an energy conserving process furnace, although the burner of this invention may be used with any type of furnace system which generally has a well-defined combustion zone such as the combustion zone of a steam generator, or an aluminum melting furnace. The burner of this invention is typically used in an energy conserving process furnace that incorporates a recuperator which is used to recover heat energy from the escaping gas such as may be used in a glass melting furnace process.

The recirculating burner of this invention is capable of operating with air preheated to temperatures in the range of 600° F. to 2,400° F. and even higher. The burner may be used without recuperator and without preheated combustion air to advantage.

The recirculating feature provides some preheating of the incoming combustion ahead of the flame zone, even when used without a recuperator, and some dilution due to diffusion and mixing of the air and the recirculated gas stream in the burner. In this manner, the concentration of oxygen in the mixture of gas and air approaching the flame is optimum with a high concentration of oxygen at the core. The oxygen concentration gradually diminishes with increasing radial distance away from the core so that the concentration of oxygen at the outer extremes of the flow pattern is a minimum. The combustion zone is therefore sheathed in a cylinder of high temperature recirculated furnace gas. The effect of providing a containment sheath of very high temperature recirculated gas rich in $CO_2$ around the flame zone (core) which is deficient in oxygen is to provide a highly radiant clean-burning flame. The $CO_2$ in the sheath at elevated temperatures is a very effective ozidizer of carbonaceous smoke-forming particles formed in the core. The $CO_2$ disassociates to $CO$, releasing atomic oxygen, which participates in the combustion process. The fuel thus formed is oxidized to $CO_2$ near the completion of the combustion process. The participation of the high temperature $CO_2$ in the combustion process permits clean burning with low levels of excess air.

In accordance with the present invention, the burner is now constructed so that it has been shortened in length considerably from the configuration disclosed in U.S. Pat. No. 4,060,379. In this way, the working distance between the furnace outer wall and the nearest obstruction has been reduced for removal of the burner when maintenance is required. With the recirculating design of the invention, heat release and heat transfer rates can be readily maximized because, the dynamics of the combustion process eliminates the "gray haze" and stratified pockets of gas in the furnace zone. The improved heat transfer rates reduces the time required to heat work in process such as forging steel which in turn reduces the amount of oxide scale formed on the steel thereby improving the life of the forging dies and the material lost due to the surface oxidation.

Substantially all of the components of the burner exposed to the heat of the furnace and the preheated combustion air are formed from heat resistant and thermal shock resistant materials, or are formed of metallic materials which are ceramic coated to protect the materials from the high temperature of the gas and the preheated air.

The burner is comprised of six principal sub-assemblies which are:
1. A metallic internally insulated frame;
2. A combustion air nozzle consisting of a nozzle plate and plug;
3. A burner barrel;
4. A recirculating sleeve with locating means;
5. A central tube;
6. A core assembly comprised of the fuel delivery system, the ignition flame safeguard and fine air ratio sensors.

The burner is designed to be inserted through the wall of the furnace cavity with provisions in the design to adapt to a variety of furnace wall thicknesses. When in position in a furnace wall, the burner boundaries are composed of the furnace cavity, the furnace walls, and the room or external atmosphere in which the furnace and burner assembly are located.

The burner is provided with certain services which vary with the application, local regulations and the type of fuel which is to be burned. Typically, these services are comprised of; a fuel supply, delivered under pressure to the burner in a liquid, gaseous or fluidized powdered state, combustion air, cooling air, electric power for ignition, a pilot fuel which is normally a gaseous fuel, an electric sensing circuit to detect the presence of or absence of a flame, and an electric sensing circuit to measure the concentration of oxygen in the furnace cavity immediately adjacent to the burner.

A cylindrical central tube is coaxially mounted in the burner housing and is bolted in place. The core assembly is coaxially mounted in the central tube and is typically held in place by two latches for ease of assembly and disassembly. The central core incorporates all of the variations necessary to change from one fuel to another. Changing from natural gas to fuel oil, for example, involves changing the core only to accommodate the fuel to be burned. The fuel nozzle which introduces fuel into the mixing zone is located at the center of the flame holder and protrudes into the furnace cavity slightly so as to deliver the fuel at the precise location required to sustain a stable flame.

A cylindrical burner barrel extends from the housing through the furnace wall. The barrel is held in place in the housing by metallic latches. The barrel provides a mounting surface for the combustion air nozzle plate and the recirculating sleeve. The recirculating sleeve is coaxially located within the barrel at the furnace end of the burner and the nozzle plate at the opposite end of the burner. Annular passages are formed between the barrel and the recirculating sleeve and between the recirculating sleeve and the central tube. Combustion air, under pressure, enters the burner at the combustion air inlet flange of the housing and flows through the housing to the combustion air nozzle. A plug valve positioned by and actually movable on the central tube is positioned to permit air to flow through the nozzle plate and along the surface of the central tube. By virtue of the "Coanda effect" the combustion air has a tendency of following the surface of the central tube until the flow encounters the spoiler at the end of the central tube. At this point the flow is detached from the central tube and vortices are formed which provide the necessary flame holding conditions at which point fuel can be injected. The pressure of the combustion air as delivered to the burner is largely converted to kinetic energy of the flow stream as the air passes through the nozzle plate. As a cnsequence, by well established rules of physical science, the pressure in the immediate vicinity of the jet ensuing from the nozzle plate is depressed below the pressure existing in the furnace cavity. Pressure depressions of one-tenth to five-tenths of an inch of water and higher have been measured at points between the recirculating sleeve and the nozzle plate. The pressure depression causes furnace gases consisting of the products of combustion to flow through the annular passage between the burner bow and the outside diameter of the recirculating sleeve to join the incoming jet of combustion air. The furnace gases are entrained by the air and flow parallel to the air forming a sheath of high temperature gas surrounding and flowing coaxially with the air. Mixing occurs between the recirculated furnace gas and the combustion air to a predetermined extent. Due to the differences in temperature of the two gas streams, mixing is minimal so that the flow nearest the central tube is largely combustion air with values on the order of 10% to 20% oxygen by volume being measured near the surface of the central tube; whereas, the composition of the flow nearest the recirculating sleeve internal surface of the discharge from the burner is composed essentially of recirculated gas having the same composition as the gas found in the furnace cavity.

The combustion air with the sheath of recirculated gas enters the flame zone with the weight flow of the gas being roughly equal to the weight flow of the air so that each flow of incoming combustion air is accompanied by one pound of furnace gas which has been recirculated from the furnace cavity; however, the proportions have been varied from ratios of 0.2 to 2 of recirculated gas to combustion air flow. As the combined flow stream exits the burners, the flame holder causes the air stream to separate forming eddies at the point where the fuel is introduced. The disruption of the flow stream provides a flame holding zone to initiate and sustain the combustion process.

To obtain clean combustion producing the lowest levels of particulate or smoke, and the lowest levels of nitrogen oxides the flow is not disrupted to such an extent as to destroy the sheath of recirculated furnace gas surrounding the flame zone. By perpetuating this sheath into the furnace cavity, a highly luminous flame can be produced. The central core being deficient in oxygen, burns rich forming fine carbonaceous particulate which are effective thermal radiation sources. This permits the efficient transfer of the energy released by the flame to the furnace walls by radiation. The high temperature sheath of recirculated gas contains $CO_2$ which disassociates providing atomic oxygen which effectively oxidizes particulate to CO and $CO_2$. As the flame progresses downstream into the furnace cavity, the CO is oxidized to $CO_2$ by the remaining oxygen.

The combustion staging effect of the process described produces the lowest levels of nitrogen oxide. By avoiding the presence of an excess of oxygen in the high temperature core, the fixation of atmospheric nitrogen is suppressed. So effective is the burner in this regard that mixtures of coal and oil have successfully been burned with excess air levels of less than 2.5% with essentially no carbon carryover to the exit gas and nitrogen oxide levels of less than one-half of that produced by comparable conventional burners in identical service.

BRIEF DESCRIPTION OF THE DRAWINGS

Numerous other objects, features and advantages of the invention should now become apparent upon a reading of the following detailed description taken in conjunction with accompanying drawings, in which.

DETAILED DESCRIPTION

With reference to the drawings, there is shown an internally recirculating burner, the components of which are predominantly made of ceramic or a like high-temperature resistant material. This burner may be of the general type used with an energy conserving process furnace such as the one shown in U.S. Pat. No. 4,060,379. The burner may be supported from the furnace in a substantially conventional manner such as one similar to the support shown in the reference U.S. patent.

Figure 1:
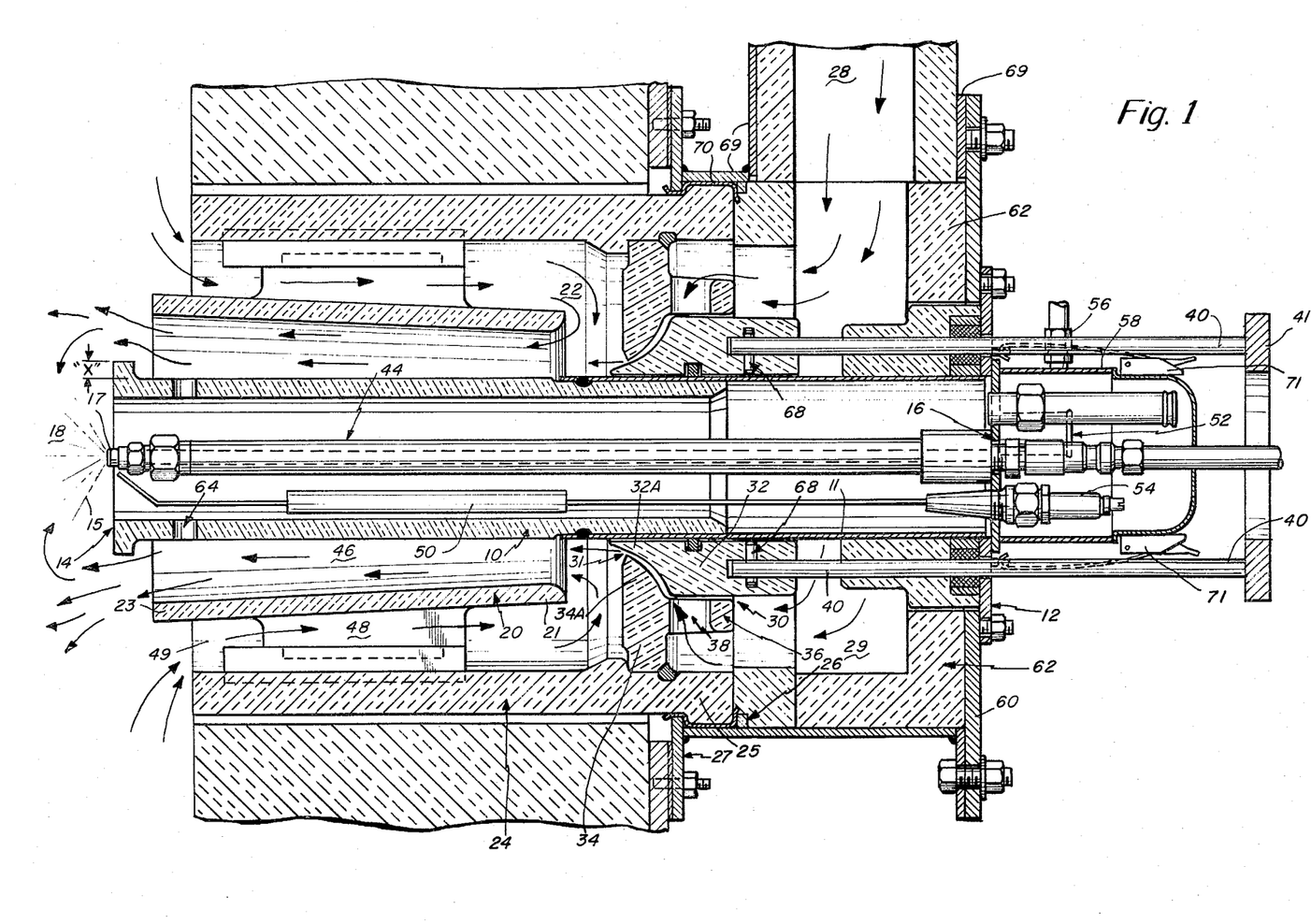
FIG. 1 is a cross-sectional view taken through a burner construction in accordance with the present invention.

The burner comprises a center body or center tube 10 supported in a substantially fixed position relative to a center tube flange mounted on the burner frame assembly 69 via the burner plate 60. The forward end of the center body 10 defines a flame holder or spoiler 14 of annular construction. The center body 10 carries means including a core assembly 16 to provide fuel flow ignition means and flame monitoring of the combustion zone 18. The core assembly is held in place by two latches 71 which couple the core to the central tube flange 12. Along the section of the center body 10 nearest to the furnace, there is provided a recirculating sleeve 20 which encircles the center body. It is noted that the recirculating sleeve 20 terminates short of the flame holder 14 and at its opposite end terminates short of contacting the nozzle plate 34. Encircling the recirculating sleeve 20 is the burner barrel 24 affixedly supported at its inner end 25 by clips welded to the burner mounting flange 27. In the drawing there is also shown an inlet passage 28 which directs combustion air into the plenum area 29 from which the air flows through the nozzle 30 entering through the ports 38 of the nozzle plate 34. The plenum area 29 is generally of annular configuration.

The nozzle means includes an annular nozzle plug 32 which is adapted to be adjusted for a particular air flow, and an annular nozzle plate 34 including at one side a distribution ring 36 provided with a plurality of spaced distribution holes 38. The nozzle plug 32 is preferably positioned by two positioning rods 40 which are securely fixed in the nozzle plug, one each at diametrically opposed locations. The outer ends of the rods 40 extending outside of the burner frame, may be tied in common to an adjustment bar which can be positioned manually by the burner man or by other means such as an electric positioning motor activated from a remote location. As the air leaves the plenum area 29 it passes through the distribution ring holes 38. These holes have their open area regulated by the adjustment of the plug nozzle 32 relative to these distribution holes, with this adjustment also providing relative movement between the plug nozzle and the nozzle plate 34, and in particular at the tip 32A and 34A of the respective plug nozzle 32 and nozzle plate 34. The flow exists through the nozzle means 30 and follows the center body 10 with the flow interrupted at the flame holder end of the center body. As the air flows on the surface of the center tube 10 some mixing occurs between the air and the neutralized gas. The amount of mixing is an important consideration in the design and operating characteristics of the burner. The air premixed with recirculated gas flows over the flame holder 14 and mixes with the fuel 15 and hot reacting gases behind the flame holder to form a stable flame that projects into the combustion zone 18.

The fuel that is used by the burner flows through a fuel tube 44 disposed within the center body core 16 which is disposed concentric within the center body 10. The fuel is coupled to a fuel source which is not shown in the drawing. At the flame holder end of the center body the fuel is injected into the zone 18. Atomizing air may be optionally used with liquid fuels and mixtures of liquid and solid (particulate) fuel to cause or assist atomization. Various means of fuel preparation may be employed, all of which would be primarily contained within the core assembly 16.

Thus, there is provided between the center tube 10 and the recirculating sleeve 20 an eductor channel 46 through which the air and recirculated gas flow passes. Also, there is the recirculation channel 48 disposed between the recirculating sleeve 20 and the burner barrel 24. The recirculated gases are aspirated into the mixing zone 46 by the combustion air. An exchange of momentum between the incoming combustion air and the furnace gas provides the movtive power to recirculate the furnace gas. The combustion products from the combustion zone 18 enter the burner at the recirculation zone entrance 49 and flow between the barrel 24 and the recirculation sleeve 20 through the zone 48 toward the nozzle plate 34. At the end 21 of the sleeve 20, the recirculated furnace gas turns radially inward and flows radially through area 22 into the mixing zone 46. Note the arrows indicating this action in FIG. 1.

Within the ceramic center tube body 10 in addition to the fuel lines and atomizing air lines, there is provided a means for ignition 50. There may also be provided a sight port 52 for viewing the flame. Actually, in the embodiment described the ceramic center tube 10 is supported by a metallic tube extension and flange bolting to the burner frame to support the entire assembly concentrically in the burner assembly. The ignition means may be of any several different types including two spark electrodes (note the spark electrode 54). Alternatively, a single spark electrode may be provided, a gas line with a flame stabilizer at the end along with a sparking means may be provided, or a clear passage for a manually-operated torch may be provided. The center tube is preferably cooled by a relatively small amount of unheated air flowing within the tube around the core components. For coupling the cooling air there are provided inlets 56 to the center body cap 58.

The drawing also shows a burner face plate 60 which covers the burner plenum 29. The face plate 60 also provides support means for the center tube and core. The burner plenum and face plate are insulated to prevent heat loss from the preheated combustion air and to prevent the burner flame from exceeding safe temperatures for operating personnel. The drawing shows insulation 62 also for insulating the plenum area.

The flame holder 14 is in the form of an annular flange at the furnace end of the center tube 10 extending radially a height "X," which may be approximately ½ inch from the outer surface of the center body. It is disposed in this manner to cause flow vortecies for mixing the air, the gas and the fuel, and to hold the flame in position on the burner. The plane of the flame holder is thus typically disposed slightly downstream of the end 23 of the recirculating sleeve 20. The downstream end of the recirculating sleeve 23 is typically disposed axially upstream from the flame holder, a distance equal to or greater than the radial height of the flame holder as measured from the outside diameter of the tube to the top of the flame holder lip, i.e., height "X." The arrangement prevents the streamlines of the flow through the recirculation zone from being moved radially by the flame holder toward the recirculating sleeve before they pass the exit plane. Premature radial movement of these streamlines interferes with the control of mixing.

The fuel tip 17 is disposed downstream slightly from the flame holder 14, preferably at a distance sufficient to prevent impingement of liquid spary in the case of a liquid fuel on the inner diameter of the center tube 10. The fuel tip preferably has a spray angle sufficient to inject the spray into the shear layer defined by the eddy region behind the flame holder at a distance downstream of the plane of the flame holder no more than from one-to-four radial heights of the flame holder, i.e., "X" to "4 times X." When gas is used in place of a liquid fuel the same relationship can apply except that a small amount of interference between the fuel jets and the inside diameter of the center body is tolerable.

The spray angle from tip 17 may be at a 120° included angle and the tip may extend ⅛" beyond the end plane of the flame holder. Also, when using a gaseous fuel nozzle there will be provided multiple radially projecting jets (for example, one row of eight holes) emanating from a position beyond the plane of the flame holder by a mean distance of ⅛" to ¼" with no overlap of the jets with the plane of the flame older.

Another feature of the present invention is concerned with a premixing scheme for premixing the combustion air and recirculated gases with the fuel. In this connection it is noted that the center body 10 is provided with a plurality of radially directed holes 64. Rather than being radially directed these holes could also be inclined. The holes are located ahead of the flame holder by an average distance of one-to-four times the radial height of the flame holder. These holes permit air and recirculated gas from outside of the center body to flow to the interior of the center body. This provides some premixing of combustion supporting gases and fuel before the fuel actually enters the extreme edges of the flame holding zone where full exposure of fuel to the combustion supporting gases takes place. This arrangement has the dual effect of helping to stabilize the flame and at the same time shape the flame. It has been found that the flame shape with the radial holes 64 is "bushy" in comparison to a more "jet-like" pattern when the holes are not used. There may be provided six ½" holes oriented radially at a centerline distance of 1¾" from the front edge of the flame holder. Also, one may provide in place of the six ½" holes, say twelve ⅛" to ¼" axial holes through the flame holder flange oriented axially around the flame holder flange of the center tube.

In accordance with another feature of the present invention, by proper positioning of components of the burner the recirculation and mixing can be controlled. The position of the entrance and exit of the recirculation sleeve with respect to the annular nozzle controls the recirculation rate and the mixing rate of the combustion air (motive fluid) and the products of combustion (secondary fluid). It is preferred to recirculate approximately equal parts of combustion products per unit of combustion air. This is a corollary to the desire to have a ratio of combustion product to combustion air between 0.5 and 1.0 at the lip of the flame holder. In one design there is a one-to-one mix at the lip of the flame holder because this represents a condition approaching that required for maximum reaction rate in the flame. Actual mixtures for maximum reaction rates are three or five-to-one (combustion products to combustion air) for an adiabatic flame. For flame temperatures considerably lower than adiabatic (as in the case of boilers and furnaces where heat is extracted directly from the flame) and with the further condition that there is a one-to-one mixture in the flame holding zone, it is necessary to add additional fuel and thus higher temperatures are achieved to reach actual maximum reaction rates and highest flame stability. This occurs for any flame holder in the shear layer separating the flow of combustion support gases and recirculating hot product gases behind the flame holder. The heat start given the combustion supporting gases approaching the flame holder by mixing in hot combustion product gases enhances flame stability.

It has been shown experimentally that too high a proportion of combustion products in the approach gas can actually destabilize a flame, as would be expected for too little oxygen being present. Thus, there is an optimum mixture and the ratio of one-to-one is approximately correct for boilers and furnaces having chamber temperatures in the 2,000° to 2,600° F. range.

The admixture of combustion product gases into the combustion air has another important effect. That is, smoke generation can be reduced to low levels by this method. At gas temperatures over 1,800° F., as will occur in any fully developed flame, carbon dioxide is as effective as air in gasifying solid carbon. In any visible yellow or white flame there are carbon particles due to incomplete combustion or thermal cracking of fuel. This particularly occurs in oxygen depleted zones. In the burner described herein, the core of the flame is depleted of oxygen because the fuel is admitted at the centerline, and practically all the air is admitted in an envelope surrounding the core; in this case represented by the shear layer formed at the flame holder. Within this shear layer fuel can be thermally-cracked readily to form carbon particulate. If a flame originated under these conditions were to be cooled more rapidly than the carbon could be gasified, there would be particulate (smoke) passing through the flame envelope. This particulate would be discharged to the atmosphere as smoke.

Normally oxygen will react with carbon to form CO or $CO_2$. At high temperatures $CO_2$ will react with carbon to form CO. In either case, the product CO can burn out later in the flame without the generation of smoke. The amount of "gasifier" available per unit volume will tend to dictate how well the carbon will be gasified.

The quantity of gasifier available is represented by both air and $CO_2$. Assuming $CO_2$ is derived by complete combustion and then recirculated into the flame holding zone, the volumetric quantity of gasifier available per unit of fuel supplied is $$\frac{3n + 1}{2} + ny,$$

where the first term, n, is the volume of oxygen and the second term, ny, is the volume of $CO_2$. The term y is the volumetric proportion of exhaust product recirculated by a unit volume of combustion air. Thus, for a single volume of fuel ($C_nH_{2n+2}$ is assumed here) the ratio of total gasifier to that available without recirculation is:

$$\frac{\frac{3n+1}{2} + ny}{\frac{3n+1}{2}}$$

Twice that available for air alone for $y \geq 1$. This has the advantage, with reactions at temperatures higher than 1800° F. of being twice as effective as air alone for eliminating carbon particles in the flame. Thus a burner can be operated with virtually zero excess air and still be very effective as a clean burning system. The design of the burner of this invention allows the choice of the $CO_2$ to $O_2$ ratio, available in the primary combustion zone, defined by the shear layer behind the flame holder.

For control of $CO_2$ to $O_2$ ratio at the flame holder lip, a key parameter is the mixedness of the recirculated product to the raw combustion air. The mixedness is controllable by the laws of fluid dynamics of mixing. For the instant burner the fluid dynamics is basically set by the dimensions of the annular nozzle 30 surrounding the center body 10 with respect to the exit end of the recirculation sleeve 20. The half-strength ray of mixedness for annular jets eminates from the lip of the annular nozzle and spreads outward at an angle of 5.4°. This angle was measured experimentally by determining both the temperature and $O_2$ concentration resulting from the mixing of a free annular jet of burning gas. The half-strength ray is defined as the locus of points measured radially from the center line of the jet having the strength of any characteristic compared to its centerline strength. The angle will depend somewhat on the actual gas composition, but the measurement made for this device is satisfactory for the purpose at hand where the components being mixed are combustion products and air. The complete definition of the component distribution radially through the spreading zone of the annular jet can be established analytically by recognizing that it is basically a Gaussian curve similar to that resulting from the spread of any gaseous jet. The interaction of the spreading jet with intersecting walls, in this case the inner side of the recirculation sleeve, is described basically as a reflection of the undisturbed composition curve shape from the wall back toward the center body. The absolute values of concentration are determined by adding the primary value and the reflected value of the Gaussian curve. What this means is that the half-strength ray reflected off the wall totals to full strength at the wall by the addition of the primary and secondary values. The actual value of the ratio of air to combustion products at the wall will, therefore, equal the actual value at the center body wall, assuming there is not a secondary reflection of the primary composition curve off the center body after its initial reflection off the recirculation sleeve.

The center body wall value is determined easily by knowing the rate of decay of the initial concentration of gases from the annular jet. This again is similar to what can be found in the literature concerning jet spreading. The position of the wall at the exit of the recirculation sleeve with respect to the half-strength ray can be selected to provide either majority combustion gas concentrations at the wall or perfect mixing, which would be 50 percent, simply by adjusting the radial position of the half-strength ray measured radially inward from the inner lip of the recirculation sleeve. There is no theoretical value, so far as concentrration is concerned, and based on free jet mixing measurements, in using a recirculation sleeve longer than can be accommodated by the half-strength line intersecting the sleeve exactly at the lip since that represents perfect mixing at the wall. On the other hand, the recirculation sleeve represents a confinement of a jet, so the actual mixing rate will be slower than for a free jet as represented by the above description. This would dictate slightly longer sleeve requirements than predicted by using free jet mixing measurements. Any additional length will complete to a minor degree achievement of uniformity of the mixture across the plane of the exit. Added length is required to achieve complete velocity uniformity as in a conventional eductor, since velocity mixes slower than mass or heat.

Usually the recirculation sleeve is tapered outward toward the exit plane to help compensate for the mean change in gas density variation from the forward end to rear end of the recirculation sleeve. However, the forward end of the recirculation sleeve must have at least enough area to accommodate that required for the primary combustion air jet and the parallel concentric movement of combustion product being recirculated. Typically, the recirculated product amounts to the same mass flow as the combustion air. So the area required for the recirculated combustion product at the entrance to the recirculation sleeve corresponds to a mass flow equal to the combustion air mass flow at a temperature equal to the combustion chamber temperature and a velocity corresponding to the pressure drop available due to the aspirating action of the primary jet. Typically, the recirculation zone at the forward lip of the recirculation sleeve has a pressure differential of approximately 0.2 inch of water for a small burner. This corresponds to a radially inward velocity of 50 to 60 feet per second.

An equal area, or greater is provided for radially inward flow at the forward lip of the recirculation sleeve through the gap between the recirculating sleeve and the nozzle plate. This flow takes place through an area defined by the imaginary cylindrical surface having the diameter of the forward lip of the recirculatin sleeve and extending between the lip and the nozzle plate 34, forming the rear of the recirculation zone. Similar or greater area must also be provided in an annular region between the recirculatin sleeve and the inside of the burner barrel.

Figure 2:
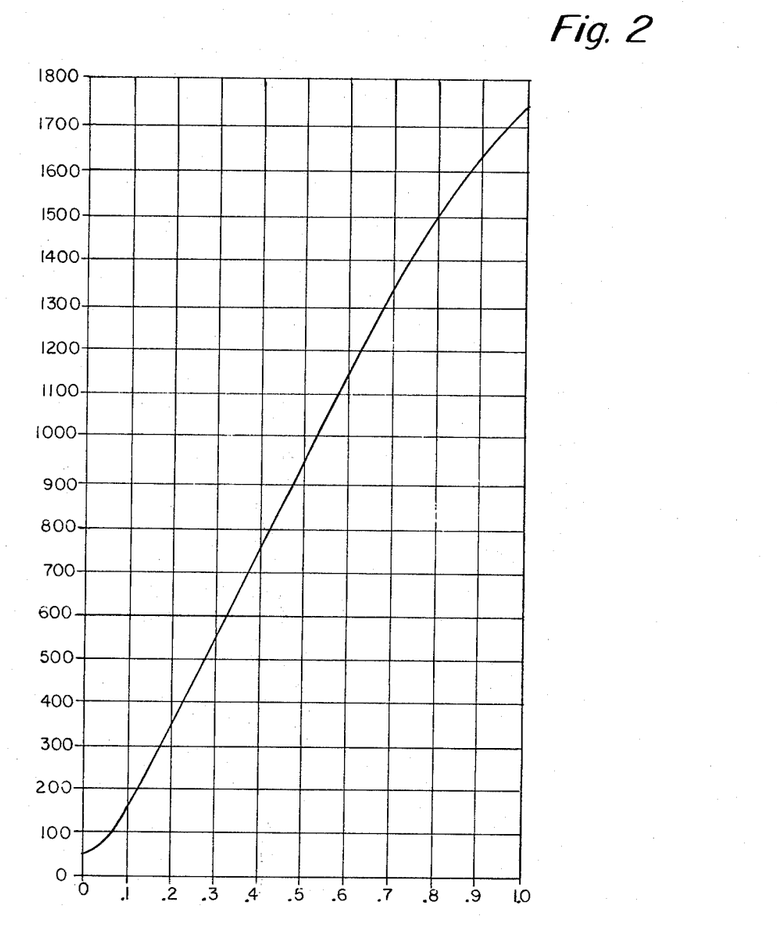
FIG. 2 is a graph that is associated with the operation of the burner.

The nozzle means 30 is one of the important features of the present invention and is in the form of an air register mechanism for controlling the amount of flow through the annular jet. This arrangement comprises a plug nozzle 32 fitting through the annular jet orifice 31 and having a rear portion thereof that moves across the plurality of holes or orifices 38 in the distribution ring 36. The diameter of the round holes in the distributor ring and the stroke of the plug nozzle are matched so that the holes are fully closed when the plug exactly fills the annular jet and are fully opened when the plug first offers zero obstruction in the annular jet as it is withdrawn. At intermediate positions of the plug nozzle 32, the open area of the annular jet varies linearly with the axial position of the plug nozzle, and the open area through the distribution holes 38 equals the area of a segment of a circle where the forward edge of the cylindrical portion of the plug nozzle forms a chord across the distributor holes 38. In the closed position the conical section 32A of the plug fits into the annular jet with a line-to-line fit. The cylindrical portion of the plug fits radially within 0.005" at the forward edge of the distributor holes. When the plug nozzle 32 is moved toward the open position, that is, as it is withdrawn, the radial clearance with the distributor ring 36 can be designed to be as large as 0.050 inches, which makes easier the fabrication of these parts from ceramics. FIG. 2 shows the air flow provided with this arrangement. For a fixed delivery pressure of the air supply, it should be noted that from approximately 10 percent open to 90 percent open, the flow varies linearly essentially with the position of the plug nozzle 32. This feature is a considerable convenience for the control of air flow by a simple mechanism.

The plug nozzle 32 is moved by operating a yoke 41 connected to operating rods 40 which in turn are connected internally to the plug nozzle 32 and locked by pins 68. The yoke 41 may be operated in any number of convenient ways including use of linear actuators, rotary actuators, or manually.

A radial seal ring of a suitable material such as asbestos rope is disposed between the plug 32 and the center tube 10 to minimize leakage of air from the plenum 29 under the plug 32 to thus add to the air normally introduced by flow between the plug 32 and the nozzle plate 34. Air leaking in this manner would reduce the operable range and the burner optimum fuel air ratio.

The entrance to the combustion air plenum 29 from the hot air supply duct 28 should have an area approximately three times the area of the distributor holes 38 in the full open position.

Fuel 15 is sent through the tube 44 to the fuel injector at the furnace end of the center tube. Liquid fuels may be placed under pressure as high as 5000 p.s.i. or any other value which matches the fuel injector characteristics. The value would depend upon the service under which the burner is to be put. Conventional burners using #2 or #6 fuel oil typically use air or steam atomization to prepare the fuel for good burning by forming droplets in the order of 20 to 60 microns. The air or steam may be fed at any pressure from 20 to 100 p.s.i. The fuel is fed in a concentric or parallel line down the center body leading to the injector at pressures also from 20 to 100 p.s.i. The fuel nozzle tip 17 thus can be any of a variety of commerical nozzles, such as the Delavan "Swirl Air" nozzle.

Pressure atomizing nozzles may also be used for #2 fuel oil. In this case, oil is fed at a low pressure of about 20 p.s.i. at minimum flow to as high as 400 to 500 p.s.i. at maximum flow. No secondary atomizing fluid need be used when pressure atomizing is employed.

High pressure atomizing systems such as the HI Super Critical Fuel System, U.S. Pat. No. 3,876,363 granted Apr. 8, 1975, LaHaye, et al, may be used with this burner.

Typically, the fuel and the atomizing medium, if used, is supplied to the fuel injector through the core in concentric tubular passages, usually with the atomizing medium flowing outside of the fuel tube. These may extend through the center body face plate of the burner at which connection can be made to facilitate the maintenance services, or to a manifold which also serves for other fluids required by the burner and which can be connected to external services in any of a number of ways. Gaseous fuels will be fed in much the same manner except that a separate atomizing fluid would not be required.

The center body 10 may also be equipped with safety devices and ignition devices extending from the center body face plate inward toward the burner tip. Typically, this includes spark electrodes 54 for igniting the fuel directly or for igniting the pilot fuel, when used. The pilot fuel will be fed in a separate line running parallel to the center body core 44 along with the spark electrodes and atomizing air and fuel lines. The gas pilot would terminate within an inch or two of the center body tip and would be ignited by the electric spark when desired. The gas pilot provides a flame or torch which will in turn ignite the main fuel spray or jet. The gas pilot would typically be used with the heavier fuel such as #6 fuel oil and mixtures such as coal and oil slurries to assure ignition.

Room for sighting down the center tube may also be provided for scanning the flame with a flame sensing device mounted on the center body face plate. The scanner, which is commercially available, is directed optically toward the center body tip. The appearance of the flame will cause a current to be generated in the flame scanner which can be detected by a suitable electronic circuit and used as a flame monitor for safety purposes in accordance with industry standards. Provision is also made for observing the appearance of the flame through a sight glass opening 52 so as to allow viewing the center body tip. The sight glass will also be mounted in the center body face plate.

Since this burner is preferably designed for use of highly preheated combustion air and a portion of the burner is exposed to combustion products directly connecting with the combustion chamber, the outer housing would be very hot were it not thermally protected by insulation. Insulation 62 is used in the combustion air chamber to keep the outer skin of the burner to temperatures of 300° F. or below. Typically, this can be accomplished with 1 to 1.5 inches of alumina-silica fiber material fastened to the inner surface.

The mounting flange 27 of the burner is approximately in the plane of the nozzle plate 34 which is also the separating plane between combustion air and recirculated combustion gases. Thus the combustion gases are exposed only to the walls of the furnace through which the burner barrel 24 extends and onto which the burner flange is fashioned. Thermal insulation 70 separates the burner frame 69 from the barrel 24.

Several burners have been tested with various fuels: natural gas, propane, #2 fuel oil, #6 fuel oil, and with coal+#6 fuel oil mixtures. The #2 and #6 fuel oil runs have been documented in boiler operation. The #2 fuel oil and coal+#6 fuel oil slurries have also been documented in furnace operation. Table 1 shows the results in terms of excess air, $NO_x$, unburned hydrocarbons, and smoke. The results are compared against other burners. It can be noted that very low smoke levels can be achieved with very low excess air with this burner. $NO_x$ is not as high as would be expected for a given flame temperature, fuel flow, and chamber size. The operating range of this burner appears satisfactory over at least a 4 to 1 max. to min. flow range.

TABLE 1

| Application | Fuel | Fuel Flow GPH | Chamber Temp. °F. | Combustion Air Temp °F. | Excess $O_2$ % | Smoke Bacharach | $No_x$ PPM | CO PPM | Combustibles % |
|---|---|---|---|---|---|---|---|---|---|
| EMISSIONS FROM TRANSIT BURNER ||||||||||
| Furnace | #2 | 14.2 | 2400 | 1000 | 1–2 | none visible | 115–140 | 17–33 | .08 |
| | | 20.7 | 2500 | 1000 | 1–2 | in steady | 105–140 | 50–60 | .1 |
| | | 15.9 | 2300 | 1000 | 1–2 | state | 80–105 | 5–15 | .1 to .12 |
| | | 24.1 | 2500 | 1000 | 1–2 | | 68–86 | | .2 |
| | | 26.7 | 2400 | 70 | 2–4 | | 60–64 | 60–63 | .1 to .12 |
| | | 27.8 | 2400 | 70 | 2–4 | | 49–56 | 45–75 | .12 to .17 |
| Boiler | #6 | 19.4 | 2400–2600 | 70 | 0.1 | 8 | 165 | | |
| | | 19.4 | 2400–2600 | 70 | 0.2 | 7 | 170 | | |
| | | 19.4 | 2400–2600 | 70 | 0.4 | 7 | 195 | | |
| | | 19 | 2400–2600 | 70 | 0.6 | 5 | 185 | | |
| | | 18.7 | 2400–2600 | 70 | 0.8 | 3 | 195 | | |
| | | 21 | 2400–2600 | 70 | 2.0 | 0 | 220 | | |
| EMISSIONS FROM TRANSJET BURNER MODIFIED FOR ZERO RECIRCULATION ||||||||||
| Furnace | #2 | 15.7 | 2300 | 1000 | 1–2 | none | 105–145 | | .1 to .12 |
| | | 23.8 | 2400 | 1000 | 1–2 | visible | 125–150 | | .12 to .15 |
| | | 25 | 2300 | 70 | 2–4 | steady | 8–12 | | |
| | | 25.5 | 2300 | 70 | 2–4 | state | 58–70 | | |

The preferred embodiment of the burner depicted in the drawing has a number of features which are considered improvements over prior art constructions. The improved operation is provided by the particular arrangement of the fuel nozzle with respect to the position of the recirculation sleeve 20 and the air nozzle and associated annular air jet. The burner of this invention is characterized by efficient control of the mixing of combustion air and recirculated gases. A further improvement in accordance with the invention is in the nozzle means or air register means which includes a matched construction of distribution ring, annular nozzle, and plug nozzle for effecting controlled opening, at any axial position, to achieve flow characteristics which are linear with opening distance.

Having described one embodiment of the present invention it should now be apparent to those skilled in the art that numerous other embodiments are contemplated as falling within the scope of this invention. While the invention has been described for use in connection with a particular type of furnace, it is understood that the burner of this invention can be used in other applications.

What is claimed is:

1. A burner capable of operating with combustion air delivered to the burner at temperatures of from 600° F. to 2400° F. and higher, said burner comprising,
   a center tube defining a forwardly extending ceramic high temperature resistant tube portion having a flame holder at a forward end of said burner,
   an encircling ceramic high temperature resistant burner barrel extending about said ceramic tube,
   an encircling recirculating ceramic high temperature resistant sleeve extending about said ceramic tube between said tube and said barrel and defining a recirculating gas passageway such that furnace gases can be carried from a forward end of said burner between said sleeve to a rearward area of said burner and then forwardly between said tube and sleeve completely surrounding said tube and then out of said forward end, said rearward area encircling said center tube, and combustion air means for providing a combustion air flow axially of said center tube between said center tube and said sleeve, said combustion air means comprising a ceramic high temperature resistant lined chamber and a ceramic high temperature resistant annular chamber plug, means forming an annular outlet from said chamber to said rearward area, means for mounting said plug for movement in a direction axially of said center tube to adjust the size of said outlet and thus adjust the passage of combustion air to the rearward area between the center tube and the sleeve, and fuel injector means positioned within said center tube and positioned to inject fuel at the forward end thereof.

2. A burner in accordance with claim 1 including a plate forming said outlet.

3. A burner in accordance with claim 2 wherein said plug and plate are both annular with the plug having a conical end and a cylindrical end, said plate having one end cooperating with the conical end of the plug and another end having openings communicating with said air chamber and defining a distribution ring cooperating with the cylindrical end of the plug.

4. A burner in accordance with claim 3 including yoke means for operating said plug.

5. A burner in accordance with claim 1 wherein said flameholder is defined by an annular flange extending outwardly of the center tube.

6. A burner in accordance with claim 5 including at least one mixing hole through the center tube spaced adjacent but rearwardly of the flameholder flange.

7. A burner in accordance with claim 1 wherein said center tube extends forwardly a greater distance than the recirculating sleeve.

8. A burner in accordance with claim 7 wherein the recirculating sleeve extends forwardly a distance equal to or greater than the burner body.

9. A burner comprising:

a center body including a forwardly extending high temperature resistant tube having a forward end flameholder comprising flanged means extending outwardly about the tube, a high temperature resistant burner body encircling the center body, means supporting the burner body and center body in concentric relationship, a high temperature resistant recirculating sleeve extending about said center body between said center body and burner body and defining a recirculating gas passageway such that furnace gases can be carried from a forward end of said burner between said burner body and sleeve to a rearward area mixing zone of said burner and then forwardly between said center body and sleeve all the while mixing with combustion air, combustion air jet means including an inlet passage for introduction of combustion air, a high temperature resistant chamber that said inlet passage leads to and means associated with said chamber intermediate the inlet passage and mixing zone for controlling combustion air flow to the mixing zone between the center body and recirculation sleeve.

10. A burner as set forth in claim 9 wherein said center body, burner body and sleeve are all of a high temperature resistant ceramic withstanding temperatures at least on the order of 2500° F. or less.

11. A burner as set forth in claim 9 wherein said flameholder is defined by an annular flange extending outwardly of the center tube.

12. A burner as set forth in claim 11 wherein said sleeve is tapered to a narrower diameter at its rearward end.

13. A burner as set forth in claim 11 wherein said sleeve has a forward end terminating short of said flameholder and a rearward end terminating short of the combustion air control means.

14. A burner as set forth in claim 13 wherein said burner body has a forward end terminating short of said sleeve and a rearward end forming a support for at least part of the combustion air jet means.

15. A burner as set forth in claim 9 including a plug and means for mounting the plug in an adjustable position to adjust the size of the passage through the combustion air jet control means to thereby adjust passage of combustion air to the area about the center body.

16. A burner as set forth in claim 15 wherein the plug has a conical forward end and cylindrical rear end, and a plate surrounding said plug having holes therein communicating said chamber with said plug.

17. A method of operating a recirculating burner having an annular recirculating channel starting from a combustion zone and passing to a rearward area and then forward to said combustion zone, said method comprising adding combustion air to said rearward area and having hot gas picked up by flow of said combustion air to pass outwardly to said combustion zone, said combustion air being added in response to an annular opening of variable cross-sectional are a including an axially movable ceramic annular plug valve, moving said ceramic plug valve to expose a greater or lesser passageway for said combustion air to said flow through said recirculating burner, and injecting fuel directly at the combustion zone axially of said recirculating channel.

18. A burner as set forth in claim 9 wherein said forward end flameholder comprises means for disrupting the flow stream to thus provide a flame holding zone that initiates and sustains the combustion.

19. A burner as set forth in claim 9 wherein said center body extends toward the combustion zone a greater distance than the recirculating sleeve while the forward end of the center body has fuel injected thereat.

* * * * *